United States Patent [19]

Poizner

[11] Patent Number: 4,930,050
[45] Date of Patent: May 29, 1990

[54] HOUSING FOR AUTOMOBILE LAMPS

[76] Inventor: Julius Poizner, 100 Westgate Boulevard, Downsview, Ontario, Canada, M3H 1P3

[21] Appl. No.: 396,267

[22] Filed: Aug. 21, 1989

[51] Int. Cl.⁵ .......................................... B60Q 1/00
[52] U.S. Cl. .................................... 362/61; 362/80; 362/267; 362/362; 362/374; 362/375
[58] Field of Search ............... 362/61, 80, 267, 362, 362/374, 375

[56] References Cited

U.S. PATENT DOCUMENTS

| | | | |
|---|---|---|---|
| 3,177,356 | 4/1965 | Worden | 362/374 |
| 3,601,596 | 8/1971 | Magi | 362/374 |
| 4,509,106 | 4/1985 | Mayer | 362/267 |
| 4,556,931 | 12/1985 | Wheatley | 362/61 |
| 4,683,523 | 7/1987 | Olsson | 362/267 |

Primary Examiner—Douglas Hart
Attorney, Agent, or Firm—Kenneth M. Garrett

[57] ABSTRACT

A housing for an automotive lamp comprises a thermoplastic bowl portion having a rim formed by a plurality of resilient fingers, and a soft elastomeric cowl molded onto the rim to cover the fingers to form a seal for a lamp lens. The cowl may be integrally formed with shock absorbing means for the lens locating within the bowl. The bowl may have one or more wire entry openings in rearward portions thereof plugged with the elastomeric material, also integrally formed with the cowl.

14 Claims, 3 Drawing Sheets

HOUSING FOR AUTOMOBILE LAMPS

FIELD OF THE INVENTION

This invention relates to a lamp housing suitable for use with automotive vehicles. It is particularly suited to housings for sealed beam units, but is not restricted thereto.

BACKGROUND OF INVENTION

Housing for automotive lamps, particularly those that are used to accessorize automobiles, such as fog lamps, comprises a bowl within which the lamp reflector is housed and a means for retaining and sealing the lens of the lamp within the housing. In certain such housings the retaining means comprises a circumscribing clip which may be separate from the bowl of the housing or form an integral part thereof, which is adjustable by a wrench or screwdriver. In an effort to obviate the use of tools the metal bowl of a further housing was enveloped an elastomeric material which projected forwardly of the rim of the bowl to form a cowl. The cowl was provided with a locating groove on the inwardyl facing surface thereof into which the lens of a sealed beam unit could be snap fitted for retention. Since the cowl was relatively unsupported it was heavy and was required to be of relatively low elastomeric resilience in order to withstand wind forces, whereby it did not provide a good weather proof seal around the lens. Moreover, neither type of housing provided a good shock mount for the lens. Owing to the exposed portion of many accessory lamps it is often found necessary to resort to providing a shock resistant mount for the light unit as a whole.

A further problem exists in providing a wire entry to the interior of the bowl. In previous housings the bowl has been provided with a small opening into which a grommet is secured and through which the wiring passes, but this does not form a weather proof seal.

It is an object of this invention to provide automotive lamp housings or the like with an improved seal for the lens.

It is another object of the invention to provide automotive lamp housings or the like with improved shock absorbing capability.

It is yet another object of the invention to provide automotive lamp housings or the like with an improved wire entry.

It is a further object of the invention to make lamp housings of significantly reduced weight and manufacturing cost.

SUMMARY OF THE INVENTION

In accordance with one apsect of the invention, a housing for a headlamp or the like comprises a relatively thin, deeply dished bowl which is suitably moulded from a high impact, resilient thermoplastic material. The bowl has a polar axis and a rim defined by a plurality of longitudinal aligned fingers which terminate in an equatorial plane. A cowl of relatively soft elastomeric material, preferably that is fusibly bondable to the high impact material covers the fingers. The cowl has an inwardly facing shoulder, preferably in the form of a continuous lip therearound, the plane thereof being proximate the plane of the finger terminations.

The soft elastomeric material provides an excellent sealing surface for a headlamp lens, and the resilient fingers grip and hold the sealing surface firmly in position while providing a sufficient degree of resilient deformation to permit the head lamp to be snap-engaged behind the retaining lip.

In accordance with another aspect of the invention, the housing is provided on the interior surface with seat means opposed to the lip, providing a positive location for rearward portions of the headlamp, which seat means is also formed of the elastomeric material unitarily with the cowl.

Preferably the seat means is in the form of longitudinally oriented cylinders; suitably the cylinders are reinforced with a core of the resilient thermoplastic material.

The elastomeric cowl and seat means provided for positive location of the headlamp in the housing, while also providing an excellent shock resistance in both the axial and lateral directions.

The bowl may be provided with an opening in the end thereof, which opening is plugged by the elastomeric material. Suitably and preferably the plug is integrally formed with the cowl and cylinders and connected thereto by runners forming rearward extensions of one or more of the cylinders.

The soft elastomeric plug to the opening in the bowl forms a wire entry path for the headlamp housing through which insulated wire conductors may be threaded using a hollow needle, the elastomeric material forming an hermetic seal on the wire insulator upon withdrawal of the needle.

The development permits the facile moulding of the housing in a two step procedure. Preferably the polymers will be compatible and weld together at the interface to form a strong bond therebetween. Non-limiting examples of compatible polymer combinations are Texin TM polyurethane elastomer with a high impact resin selected from Makrolon TM polycarbonate resin, or Makroblend TM polycarbonate/polyester resin; Kraton TM elastomer and polypropylene copolymer resin.

These foregoing objects and aspects of the invention, together with other objects, aspects and advantages thereof will be more apparent from the following description of a preferred embodiment thereof, taken in conjunction with the following drawings.

DESCRIPTION OF THE PREFERRED EMBODIMENT

Figure 1:
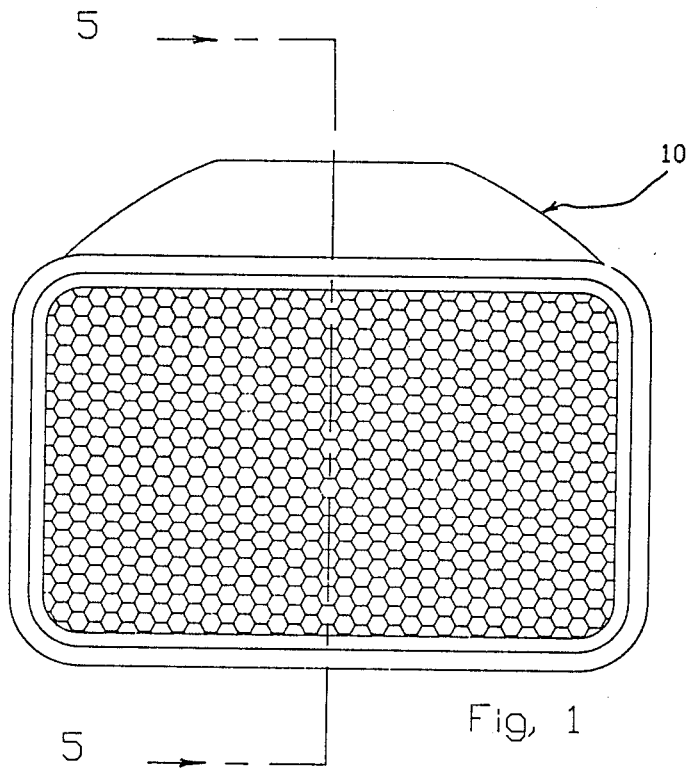
FIG. 1 shows in perspective view from the top front a head lamp using a lamp housing in accordance with the invention.
Figure 2:
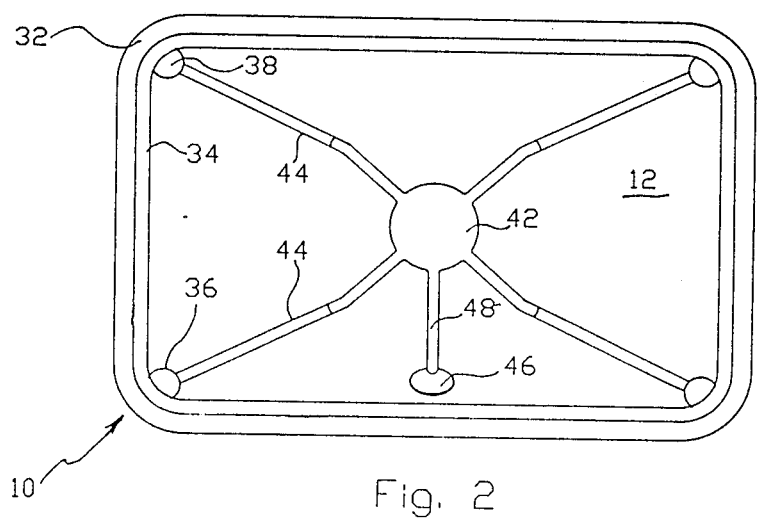
FIG. 2 shows the housing in frontal elevation.
Figure 3:
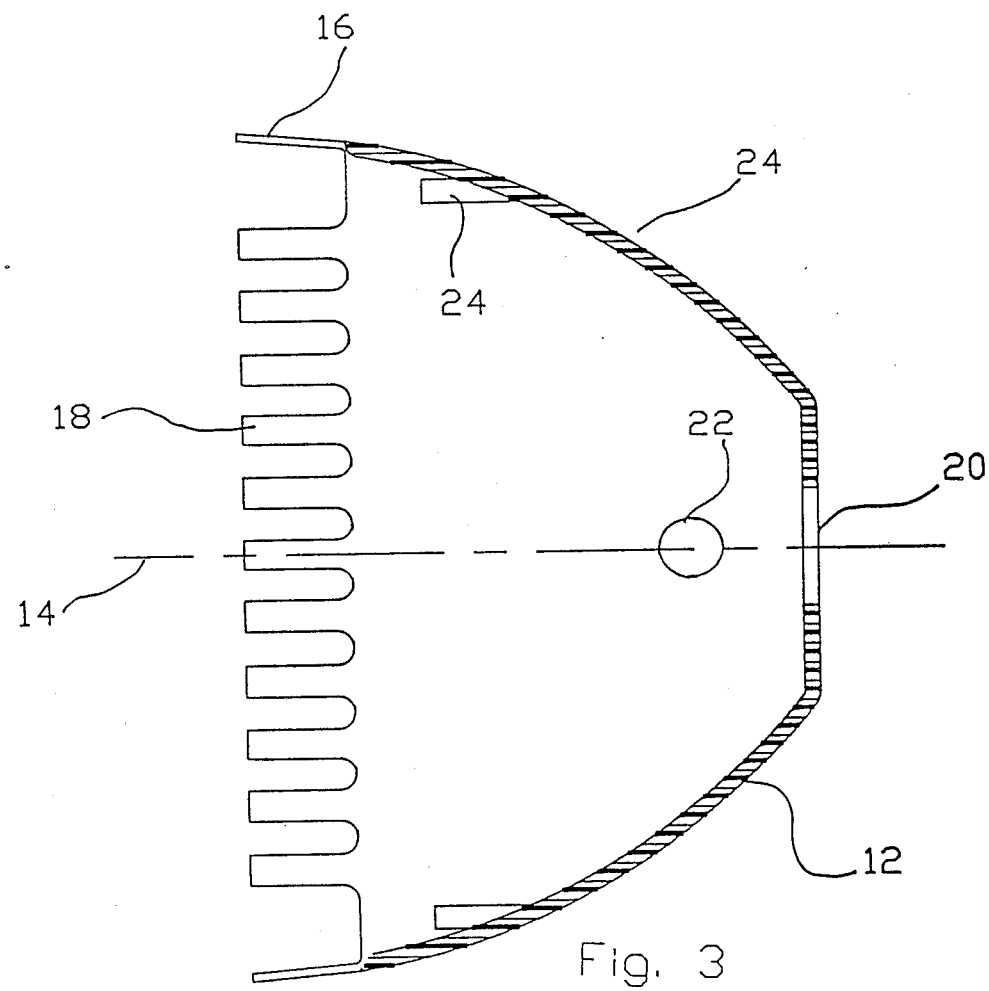
FIG. 3 is a section along 2—2 of the bowl portion of the housing of FIG. 1.
Figure 4:
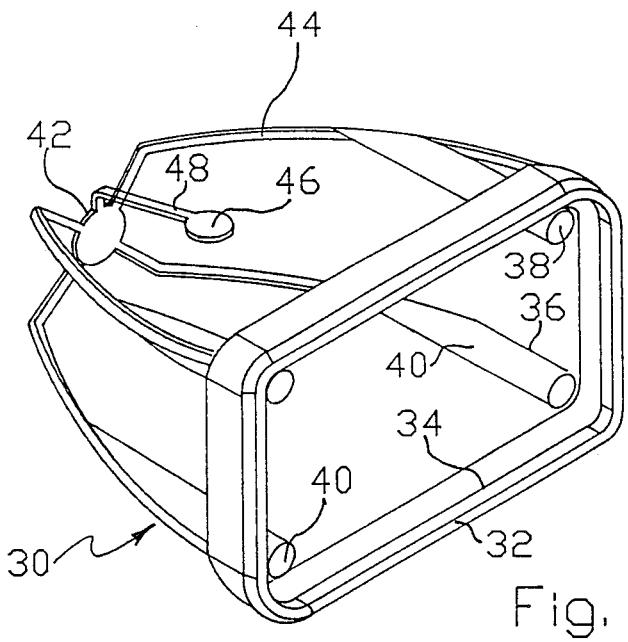
FIG. 4 is a perspective view of the elastomeric portion of the housing of FIG. 1 seen from the front, bottom.
Figure 5:
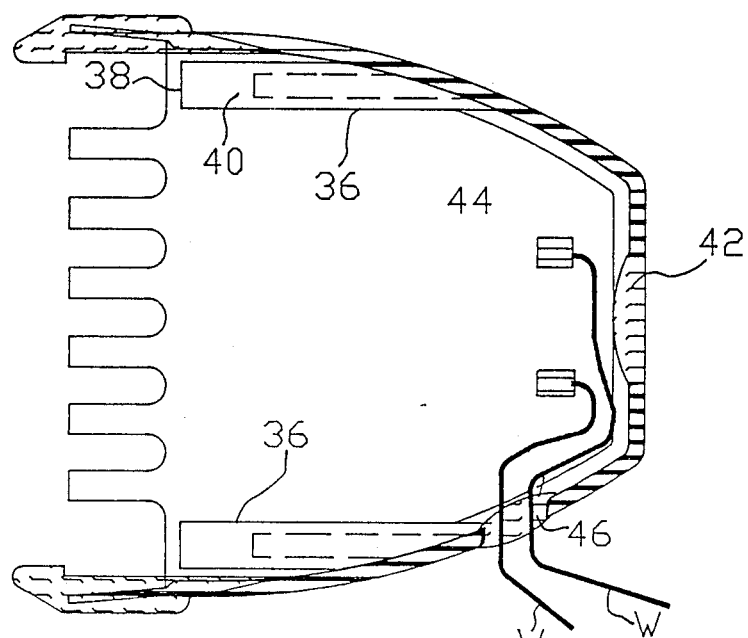
FIG. 5 is a section along 5—5 of FIG. 1 of the housing additionally showing wire conductors therefor.

Referring to the drawings in detail, a housing 10 for an automotive lamp or the like comprises a first part in the form of deeply dished bowl 12 having a notional front to back polar axis 14 thereto. Bowl 12 has a relatively thin wall thereto of generally uniform thickness and is moulded from a high impact thermoplastic material. Bowl 12 has a rim 16 thereto defined by a plurality of fingers 18 longitudinally aligned, the fingers terminating in an equatorial plane. The resiliency of fingers 18 is readily adjusted by varying the dimensions of the fingers including their length, width and thickness, which as herein may be less than that of the remaining wall portions of bowl 12, and the spacing therebetween. Thus bowl 12 will be relatively rigid, whereas rim portion 14 will be resiliently sprung.

Bowl 12 is provided with a first small opening 20 in the end wall thereof and adjacent thereto a second small opening 22 on a side wall thereof. Bowl 12 is also provided on the interior thereof with a plurality of tabs 24 longitudinally oriented which terminate in a plane locating somewhat below rim 16.

Housing 10 further comprises a second part 30 suitably moulded from a soft, elastomeric material preferably having a hardness in the range of about 45 to about 60 Durometer, which material will be compatible with and bond to the high impact thermoplastic material forming bowl 12. Part 30 is unitarily formed by molding directly onto bowl 12, and comprises a cowl 32 having a rearwardly facing lip 34 formed about the inner surface thereof. Cowl 32 covers and encloses fingers 18, and lip 34 locates proximate the equatorial plane in which the fingers terminate. Part 30 further comprises a plurality of cylinders 36 which surround tabs 24, which form a reinforcing core therefor. Cylinders 36 provide end surface portions 38 generally opposed to lip 34 which assist in locating a sealing an automotive lamp in the polar direction, and cylindrical surface portions 40 which assist in locating and sealing in automotive lamp in lateral directions.

Part 30 additionally comprises a first plug 42 which seals first opening 20, and runners 44 which connect between plug 42 and rearward portions of cylinders 38. Runners 44 form a flow path for molding part 30, and may also be shaped and proportioned to provide a shock absorbing location for a lens housed in housing 10. A second plug 46 seals second opening 22 in bowl 12, and connects to first plug 42 by a spur runner 48.

Opening 20 forms a convenient entry path for the injection of elastomeric molding material into the interior of bowl 12 during the molding step. Plug 42 serves as a convenient entry path for wire conductors W into the interior of housing 10, with plug 46 providing an alternative entry path.

It will be apparent that many changes may be made to the illustrative embodiment, while falling within the scope of the invention and it is intended that all such changes be covered by the claims appended hereto.

I claim:

1. A housing for an automotive lamp or the like comprising:
   a thin, deeply dished bowl of high impact, resilient thermopastic meterial, said bowl having a polar axis and a rim thereto;
   said rim being defined by a plurality of longitudinally aligned fingers terminating in an equatorial plane, and
   a cowl of elastomeric material covering said rim to form a seal for the lens of a lamp when contained within said housing,
   said elastomeric material and said thermoplastic material being compatible and welded together at the interface therebetween.

2. A housing as defined in claim 1, further comprising shoulder means associated with said cowl for the snap retention of said lens.

3. A housing as defined in claim 2, wherein said shoulder means comprises a lip circumscribing the inwardly facing surface of said cowl.

4. A housing as defined in claim 2, further comprising a seat means formed of said elastomeric material opposed to said shoulder means.

5. A housing as defined in claim 3, wherein said shoulder means locates proximate said equatorial plane.

6. A housing as defined in claim 4, wherein said seat means comprises a plurality of longitudinally oriented cylinders locating on the inner surface of said bowl.

7. A housing as defined in claim 6, wherein said cylinders are reinforced with a core of said thermoplastic material.

8. A housing as defined in claim 6, wherein said bowl is provided with a small opening proximate the polar end thereof, and a plug of said elastomeric material, seals said small opening to form a wire entry path to said housing.

9. A housing as defined in claim 8, wherein said cowl, cylinders and plug are unitarily formed.

10. A housing for an automotive lamp or the like comprising:
    a thin, deeply dished bowl of high impact, resilient thermoplastic material, said bowl having a polar axis and a rim thereto;
    said rim being defined by a plurality of longitudinally aligned fingers terminating in an equatorial plane;
    a cowl of elastomeric material covering said rim to form a seal for the lens of a lamp when contained within said housing;
    shoulder means associated with said cowl for the snap retention of said lens, and
    seat means unitarily formed with said cowl opposed to said shoulder means, said set means comprising a plurality of longitudinally oriented cylinders locating on the inner surface of said bowl.

11. A housing as defined in claim 10, wherein said cylinders are reinforced with a core of said thermoplastic material.

12. A housing as defined in claim 10 wherein said bowl is provided with a small opening proximate the polar end thereof, and a plug of said elastomeric material seals said small opening to form a wire entry path to said housing.

13. A housing as defined in claim 12, wherein said cowl, cylinders and plug are unitarily formed.

14. A housing as defined in claim 10, wherein said elastomeric material and said thermoplastic material are compatible and welded together at the interface therebetween.

* * * * *